(12) United States Patent
Stoehr et al.

(10) Patent No.: US 11,667,271 B2
(45) Date of Patent: Jun. 6, 2023

(54) METHOD FOR ACTIVATION AND DEACTIVATION OF A CONTROL DEVICE

(71) Applicant: Robert Bosch GmbH, Stuttgart (DE)

(72) Inventors: Bernd Stoehr, Sachsenheim (DE); Christian Jelenowski, Kupferzell (DE); Frank Baehrle-Miller, Schoenaich (DE); Steffen Zechmeister, Bad Wimpfen (DE)

(73) Assignee: Robert Bosch GmbH, Stuttgart (DE)

( * ) Notice: Subject to any disclaimer, the term of this patent is extended or adjusted under 35 U.S.C. 154(b) by 684 days.

(21) Appl. No.: 16/733,853

(22) Filed: Jan. 3, 2020

(65) Prior Publication Data
US 2020/0238962 A1    Jul. 30, 2020

(30) Foreign Application Priority Data
Jan. 25, 2019    (DE) ..................... 10 2019 200 955.7

(51) Int. Cl.
| | | |
|---|---|---|
| *B60R 16/02* | (2006.01) | |
| *B60T 8/171* | (2006.01) | |
| *B60T 13/74* | (2006.01) | |
| *B60T 8/32* | (2006.01) | |
| *B60T 1/06* | (2006.01) | |
| *F16D 65/18* | (2006.01) | |
| *F16D 55/226* | (2006.01) | |

(Continued)

(52) U.S. Cl.
CPC .............. *B60T 8/171* (2013.01); *B60T 1/065* (2013.01); *B60T 8/3205* (2013.01); *B60T 13/741* (2013.01); *F16D 55/226* (2013.01); *F16D 65/183* (2013.01); *B60T 2220/03* (2013.01); *B60T 2240/00* (2013.01); *F16D 2121/24* (2013.01); *F16D 2125/40* (2013.01)

(58) Field of Classification Search
CPC ..... B60R 16/0315; B60T 7/107; B60T 8/171; B60T 13/741; B60T 13/746; B60T 1/065; B60T 2220/03; B60T 2240/00; B60T 8/3205; B60G 17/0185; B60G 17/0195; F16D 2121/24; F16D 55/226; F16D 65/183; B60W 10/182; B60W 2510/186; B60W 2710/186
See application file for complete search history.

(56) References Cited

U.S. PATENT DOCUMENTS

| | | | | |
|---|---|---|---|---|
| 5,757,773 A | * | 5/1998 | Tsuji ..................... | H04L 12/12 340/3.1 |
| 6,182,807 B1 | * | 2/2001 | Saito ..................... | F16F 15/02 191/2 |

(Continued)

FOREIGN PATENT DOCUMENTS

| | | |
|---|---|---|
| DE | 10 2004 004 992 A1 | 9/2005 |
| EP | 1 063 453 B1 | 12/2000 |

*Primary Examiner* — Robert A. Siconolfi
*Assistant Examiner* — Stephen M Bowes
(74) *Attorney, Agent, or Firm* — Maginot, Moore & Beck LLP

(57) ABSTRACT

In a method for activating and deactivating a control unit which can be used to control an electrically activatable assembly, the control unit is switched between a waking state, a sleep state and a deactivated state, wherein in the sleep state, the control device is disabled but can be transferred into the waking state by means of a sensor signal.

11 Claims, 3 Drawing Sheets

(51) Int. Cl.
*F16D 125/40* (2012.01)
*F16D 121/24* (2012.01)

(56) References Cited

U.S. PATENT DOCUMENTS

| | | | |
|---|---|---|---|
| 6,275,167 B1* | 8/2001 | Dombrowski | B60R 16/0315 340/12.1 |
| 10,179,573 B2* | 1/2019 | Baehrle-Miller | B60T 8/171 |
| 2004/0238299 A1* | 12/2004 | Ralea | B60T 17/221 188/156 |
| 2007/0225890 A1* | 9/2007 | Ringlstetter | B60T 13/66 188/161 |
| 2018/0050678 A1* | 2/2018 | Wolff | B60T 17/226 |
| 2018/0057008 A1* | 3/2018 | Utagawa | H04L 12/40 |

* cited by examiner

METHOD FOR ACTIVATION AND DEACTIVATION OF A CONTROL DEVICE

This application claims priority under 35 U.S.C. § 119 to application no. DE 10 2019 200 955.7, filed on Jan. 25, 2019 in Germany, the disclosure of which is incorporated herein by reference in its entirety.

TECHNICAL FIELD

The disclosure relates to a method for activation and deactivation of a control unit via which an electrically activatable assembly can be controlled, in particular of a control device for controlling an electric brake motor in a vehicle parking brake.

BACKGROUND

From patent DE 10 2004 004 992 A1 a brake system for a vehicle is known that comprises a hydraulic vehicle brake and an electromechanical parking brake with an electric brake motor. The brake motor of the parking brake is integrated into a wheel brake unit of the hydraulic vehicle brake, wherein the electric brake motor adjusts a brake piston in the direction of a brake disc, in order to hold the vehicle stationary when stopped. In the case of a normal braking operation while the vehicle is moving, the brake piston is subjected to the brake pressure when the hydraulic vehicle brake is applied. The electric brake motor is activated by a control unit of an ESP system (electronic stability program).

EP 1 063 453 B1 discloses a control device for implementing an automatic parking and roll-away prevention device for a motor vehicle. The control system consists of a control unit and an actuator which is controlled by the control unit if on the basis of sensor signals of a seat-belt buckle sensor, a seat occupancy sensor and/or an engine-hood or trunk lid opening sensor, it is determined that the driver has either left or wants to leave the vehicle.

SUMMARY

By means of the method according to the disclosure a control unit can be activated and deactivated, via which an electrically activatable assembly can be controlled. The control unit is preferably installed in a vehicle and controls, for example, an electrical actuator motor in the vehicle. The actuator motor is preferably an electric brake motor in a vehicle parking brake, via which a brake piston which carries a brake lining is pressed against a brake disc when parking the vehicle. Brake piston and brake disc are preferably parts of a wheel brake device belonging to a hydraulic vehicle footbrake, which is used to brake the vehicle during normal braking operation. In this case, the hydraulic brake pressure acts on the brake piston and moves this towards the brake disc.

Other electrically activatable assemblies that can be controlled by the control unit also exist, such as an electrical actuator motor in a steering system of a vehicle, the actuator motor being used to generate a steering torque that supports the steering movement.

Using the method, the control unit is activated and deactivated according to the situation, wherein in the activation phase the electrically activatable assembly can be controlled via the control unit, whereas in the deactivation phase the control unit is in the powered-off state in which the assembly cannot be controlled by the control unit. When the control unit is powered on it is in a waking state.

In addition to the waking state and the powered-off state, in the method according to the disclosure the control unit can occupy a sleep state, in which the assembly cannot be controlled by the control unit so that the latter is also located in the deactivated state as in the powered-off state. However, the control unit can be transferred back into the waking state by means of a sensor signal of at least one monitoring sensor, in which the control unit is active and the electrical assembly can be controlled by the control unit. Thus, the control unit can occupy at least three different states: a waking state, a sleep state and a powered-off state. The sleep state differs from the powered-off condition in that while in both states the control device is disabled and hence the assembly cannot be controlled by the control unit, in the powered-off state the control unit can only be transferred into the waking state by a restart, whereas in the sleep state the control unit does not need to be switched on but can be transferred into the waking state by the sensor signal of the monitoring sensor. In the powered-off state, on the other hand, the control unit cannot be switched on again via a sensor signal.

This procedure has the advantage that in the sleep state the power consumption is significantly reduced due to the deactivated control unit. However, in the sleep state a monitoring function can be implemented, in which in the event of a corresponding sensor signal of the monitoring sensor, the control device is awoken from the sleep state and transferred into the waking state, in which the full functionality of the control unit and ability to control the electrically activatable assembly is available. In the sleep state the energy consumption of the control unit usually falls in comparison to the waking state, to a fraction, for example no more than 10%. Since the control unit can be transferred back into the waking state via the sensor signal, an automatic change in the state of the control device is possible and does not require a power-on intervention by the driver or a monitoring person.

In particular in the case of an application in vehicles this approach has the advantage that in the sleep state, despite the deactivation of the control device, safety-critical functions can still be monitored. Thus, for example, in the case of a control unit for the electric brake motor of a parking brake, after the vehicle has been parked it is possible to monitor whether the vehicle actually remains at a standstill or possibly set into motion by itself, for example if the vehicle is parked on a sloping road. In this case, the control unit which is in the sleep state can be transferred via an appropriate sensor signal, for example the signal of a wheel speed sensor which supplies a corresponding signal value, from the sleep state into the waking state, whereupon the control unit can activate the electric brake motor once again to perform a re-tensioning operation with an increased braking force.

The sleep state is preferably occupied automatically by the control unit itself, once the control unit is transferred into the sleep state via an appropriate signal. In the case of an electric brake motor of a parking brake in a vehicle the sleep state can be occupied, for example, if it is detected that the vehicle should be parked for a long period, for example in the case of the vehicle being stopped, the stopping of the vehicle engine and the release of the driver's seat belt. The sleep state can be occupied as soon as the parking brake is activated, either by the driver or via an appropriate signal.

In accordance with an advantageous embodiment the sleep state is maintained for a specified time interval, for example, for one hour. After the expiry of the specified time interval, the state of the control unit is automatically changed, in particular transferred from the sleep state into the powered-off state, which can only be changed again by switching on the control unit.

In an alternative design, it is also possible that after the expiry of the specified time interval the control unit is transferred automatically from the sleep state into the waking state, whereupon in the waking state a condition monitoring of the assembly or the environment of the assembly is carried out. Advantageously, after the completion of the condition monitoring the control unit automatically switches from the waking state into the powered-off state. This procedure has the advantage that before the control unit is powered off, one or more function checks are carried out, which may be relevant to safety. Thus in the case of a parking brake, for example, which together with the hydraulic vehicle brake forms a braking system, it is possible to check a hydraulic pressure lock in the vehicle brake for seal tightness and the durability of the enclosed hydraulic pressure. In the event of a pressure drop, the control unit can be used to control a pump motor and valves in the vehicle hydraulic brake in order to compensate for the pressure drop and to set a defined pressure level in the hydraulic vehicle brake. Alternatively or additionally, a fault entry can be generated, which at the next system start will inform the driver of a limited or unavailable function.

In general, the control unit, which is automatically transferred from the sleep state into the waking state after expiry of the specified time interval, can perform a condition monitoring of an actuator by monitoring the actuator or the behavior of the actuator. For example, in the case of a parking brake the electric brake motor can be activated and the behavior of the brake motor during the activation can be monitored, for example, in the case of an engagement operation it can be checked whether a required force level is reached.

In the sleep state of the control unit at least one monitoring sensor is active, with which a state change in the assembly or in the environment of the assembly is monitored and recorded. It may be appropriate to actively energize or supply energy to the at least one monitoring sensor. A change of state occurs when the supplied sensor value undergoes a change which exceeds a defined amount.

Alternatively, it is also possible to use passive monitoring sensors without power or an energy supply. If the state does not change, these monitoring sensors will not supply a sensor signal. Only in the event of a change of state are signals supplied by the passive monitoring sensors, which can be used as a basis for the change in state of the control unit.

According to yet another advantageous design, the control unit can additionally be transferred into a follow-on state between the waking state and the sleep state, and in which the control unit is active, but the assembly monitored by the control unit can be only be controlled in a limited way. The follow-on state directly follows the waking state and represents a transitional state which is terminated on the existence of termination conditions. The follow-on state is located between the waking state and the sleep state and is occupied directly after the waking state. With the ending of the follow-on state, the control unit is transferred into the sleep state.

In the follow-on state, in which the control unit is active but the assembly is only controllable in a limited way, function checks, in particular safety-related function checks, are usually carried out before the control unit is switched off. For example, in the case of a parking brake with electric brake motor it may be expedient to check whether the vehicle has been set in motion within a limited period of, for example, three minutes after the beginning of the follow-on condition, whereupon the parking brake is activated again to keep the vehicle stationary for a long period. The follow-on state may also last for a longer period of, for example, up to 50 minutes. Further function checks in the case of brake systems are the brake pressure, the gradient on which the vehicle is parked, and a temperature estimate of the braking system.

In accordance with an advantageous design, the follow-on state is maintained over a specified time interval, wherein on the expiry of the time interval the control unit is automatically transferred into the sleep state. The sleep state differs fundamentally from the follow-on state, since in the follow-on state the control unit is activated, whereas in the sleep state the control device is deactivated.

For the monitoring sensor which is assigned to the control unit and via which the control unit is transferred from the sleep state into the waking state on detection of a corresponding sensor signal, in the case of a parking brake, in addition to or as an alternative to the wheel speed sensor described above, an acceleration sensor can also be considered, in particular a longitudinal acceleration sensor, via which an unintentional movement of the vehicle can be registered after the vehicle has been parked. If applicable, the movement of the vehicle can also be detected using another type of sensor, for example via an environment sensor for monitoring an environment, such as a camera.

In some cases it may also be expedient to use a pressure sensor as a monitoring sensor, with which the hydraulic brake pressure in the vehicle footbrake is monitored.

The disclosure also relates to a control unit for carrying out the method. In the control unit, sensor signals of the at least one monitoring sensor are processed and in addition, actuating signals for controlling the electrically activatable assembly are also generated in the control unit. In the case of a parking brake, actuating signals for controlling the electric brake motor are generated in the control unit. The control unit may be part of the vehicle footbrake.

The disclosure finally relates to a parking brake for a vehicle, which is advantageously used to keep the vehicle stationary when stopped. The parking brake comprises at least one electromechanical braking system on a vehicle wheel with an electric brake motor, which moves a brake piston against a brake disc in order to generate braking force. Advantageously, the parking brake comprises at least two electromechanical braking systems on a left-hand and a right-hand wheel of the same axle, in particular on the rear axle of the vehicle. The adjustable components of the electromechanical braking system are controlled by the control unit.

The parking brake together with the vehicle footbrake forms a braking system in the vehicle. In normal braking operation the brake piston is moved towards the brake disc by the hydraulic brake pressure of the vehicle footbrake, and when the parking brake is activated it is moved by the electric brake motor.

In an alternative design the hydraulic vehicle footbrake is decoupled from the electric parking brake. For example, it may be expedient for both the hydraulic vehicle footbrake and the electric parking brake to each have a separate brake caliper with brake piston and brake lining, but act on the same brake disc.

The disclosure also relates to a computer program product with a program code which is designed to execute the above-mentioned method steps. The computer program product runs in a control unit as described above.

BRIEF DESCRIPTION OF THE DRAWINGS

Further advantages and expedient designs can be derived from the description of the figures and the drawings. Shown are.

DETAILED DESCRIPTION

Figure 1:
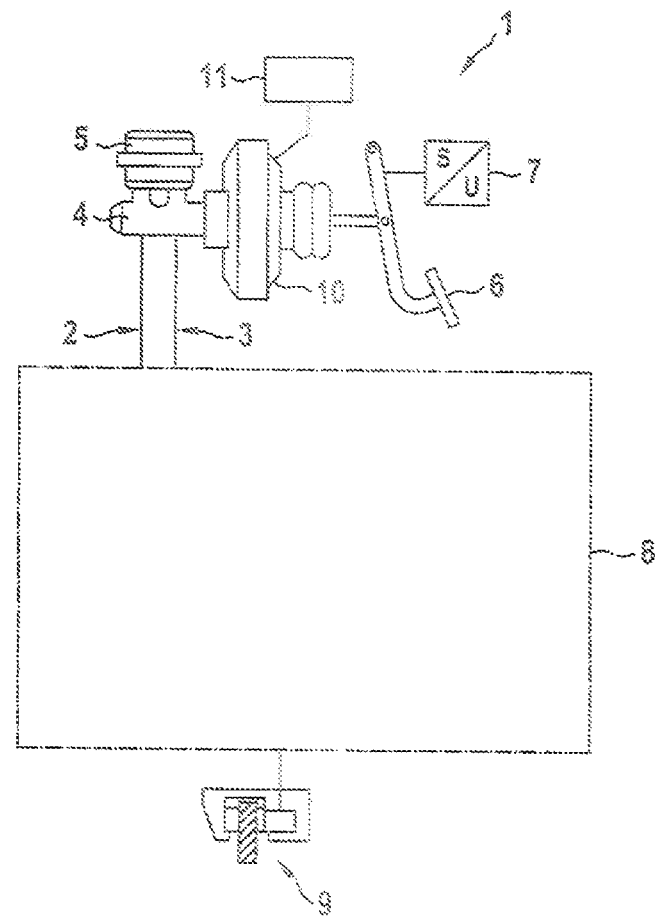
FIG. 1 a schematic representation of a hydraulic vehicle footbrake, wherein wheel braking devices of the vehicle footbrake on opposite wheels of the same axle are each equipped with an electro-mechanical braking system with an electric brake motor, FIG. 2 a section through an electro-mechanical braking system with an electric brake motor, FIG. 3 a flow diagram with method steps for activating and deactivating a control unit, which controls the electric brake motor of the electro-mechanical braking systems.

In the figures, equivalent components are labelled with the same reference numerals.

The brake system for a vehicle shown in FIG. 1 comprises a dual-circuit hydraulic vehicle footbrake 1 with a first hydraulic brake circuit 2 and a second hydraulic brake circuit 3 for supplying and controlling wheel braking devices 9 on each wheel of the vehicle with a brake fluid under hydraulic pressure. The two brake circuits 2 and 3 are connected to a common master brake cylinder 4, which is supplied with brake fluid via a brake fluid reservoir 5. The master cylinder piston in the master cylinder 4 is operated by the driver via the brake pedal 6, and the pedal travel exerted by the driver is measured via a pedal travel sensor 7. Between the brake pedal 6 and the master brake cylinder 4 a brake servo 10 is located, which comprises, for example, an electric motor, which preferably activates the master cylinder 4 via a transmission (iBooster).

In addition to or as an alternative to the iBooster the hydraulic vehicle brake 1 can have an integrated electro-hydraulic braking unit with an electric motor-driven plunger. The vehicle brake 1 is advantageously designed as a Brake-By-wire system, wherein a brake pedal operation leads to a displacement of hydraulic volumes in a pedal travel simulator. The brake pressure is built up according to the brake pedal actuation via an electric motor-driven actuation of the plunger. In the event of a failure of the electro-hydraulic brake unit, isolating valves which connect the brake circuits to the master cylinder 4 are opened, so that when the brake pedal is operated the driver has a direct hydraulic bypass route to the wheel braking devices 9.

The actuating movement of the brake pedal 6 measured by the pedal position sensor 7 is transmitted as a sensor signal to an open-loop or closed-loop control device 11 in which control signals for activating the brake servo 10 are generated. The supply of the wheel braking devices 9 with brake fluid is carried out in each brake circuit 2, 3 via different switching valves, which together with other units are part of a hydraulic braking system 8. The hydraulic braking system 8 additionally comprises a hydraulic pump, which forms part of an electronic stability program (ESP).

The two hydraulic brake circuits 2 and 3 of the vehicle footbrake 1 are distributed diagonally, for example, so that the first brake circuit 2 supplies brake fluid, for example, to the two wheel braking devices 9 on the left front wheel and on the right rear wheel and the second brake circuit 3 supplies the two wheel braking devices 9 on the right front wheel and on the left rear wheel. Alternatively, it is also possible to split both hydraulic brake circuits 2 and 3 of the vehicle footbrake 1 over the wheel braking devices on the front axle and the wheel braking devices on the rear axle.

Figure 2:
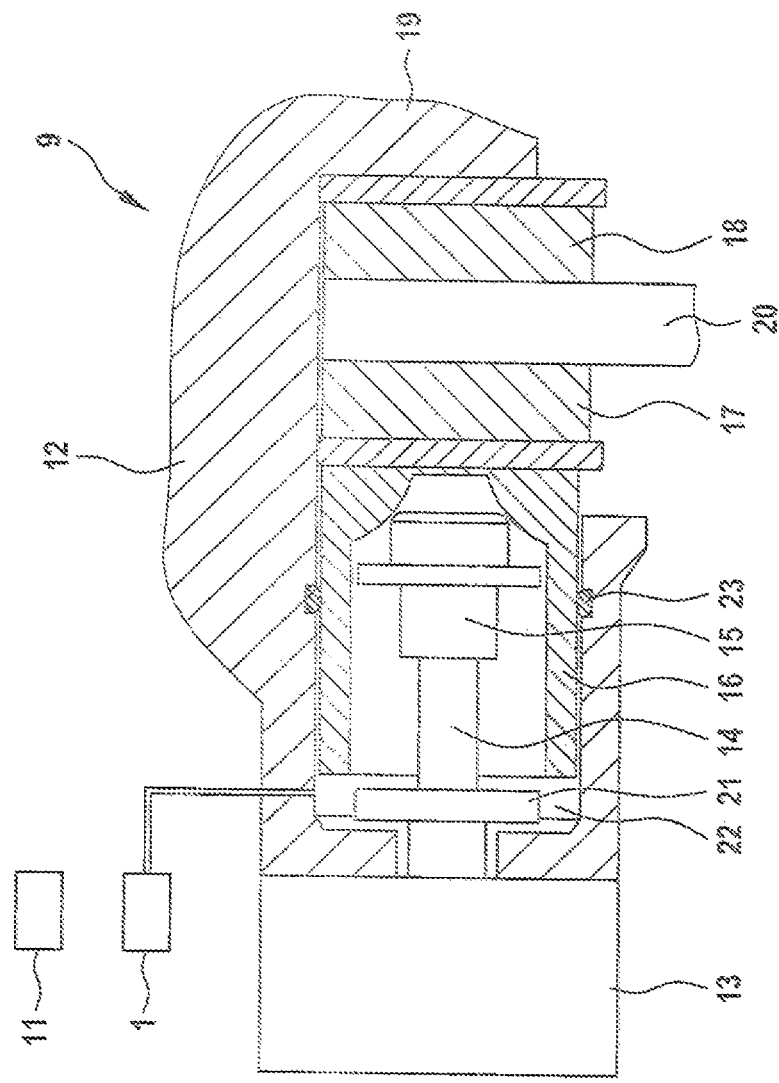

In FIG. 2 the wheel braking device 9, which is arranged on a wheel on the rear axle of the vehicle, is shown in detail. The wheel braking device 9 is part of the hydraulic vehicle footbrake 1 and is supplied with brake fluid 22 from a brake circuit 2, 3. The wheel brake device 9 also has an electro-mechanical braking system, which can be used as a parking brake to keep the vehicle stationary when stopped, but also for braking when the vehicle is moving. The parking brake comprises two identically designed electro-mechanical braking systems on two laterally opposite vehicle wheels.

The electro-mechanical braking system comprises a brake caliper 12 with a gripper 19, which engages around a brake disc 20. As an actuator element the braking system has a DC electric motor as a brake motor 13, whose rotor shaft drives a rotating spindle 14, on which a spindle nut 15 is mounted in a rotationally fixed manner During a rotation of the spindle 14, the spindle nut 15 is axially displaced. The spindle nut 15 moves within a brake piston 16, which supports a brake lining 17 which is pressed against the brake disc 20 by the brake piston 16. On the opposite side of the brake disc 20 a further brake lining 18 is located, which is fixed to the gripper 19 in a stationary manner. The brake piston 16 is sealed on its outer side against the accommodating housing with a pressure-tight seal using an encompassing sealing ring 23.

Within the brake piston 16, during a rotational motion of the spindle 14 the spindle nut 15 can move axially forwards towards the brake disc 20, or during a rotational movement of the spindle 14 in the opposite direction axially backwards until a stop 21 is reached. To create a clamping force the spindle nut 15 acts upon the inner end face of the brake piston 16, which causes the brake piston 16 with the brake lining 17, mounted in the braking system in an axially displaceable manner, to be pressed against the facing surface of the brake disc 20.

For the hydraulic braking force the hydraulic pressure of the brake fluid 22 from the hydraulic vehicle footbrake 1 is applied to the brake piston 16. The hydraulic pressure can also be used to provide effective support when the electro-mechanical braking system is operated when the vehicle is stopped, so that the total braking force is composed of the component applied by the electric motor and the hydraulic component. While the vehicle is being driven, to carry out a braking operation either only the vehicle hydraulic footbrake is active or both the hydraulic vehicle footbrake and the electromechanical braking system or only the electro-mechanical braking system is active to generate braking force. The actuating signals for controlling both the adjustable components of the hydraulic vehicle footbrake 1 and the electromechanical wheel braking device 9 are generated in the open-loop or closed-loop control device 11.

The wheel braking device 9 shown in FIG. 2, which is equipped with the brake motor 13 in addition to the electromechanical braking system, is preferably located on the rear axle of the vehicle. The electrical brake motors 13 in the two wheel braking devices 9 on the two rear wheels on the rear axle can be controlled independently of each other.

Figure 3:
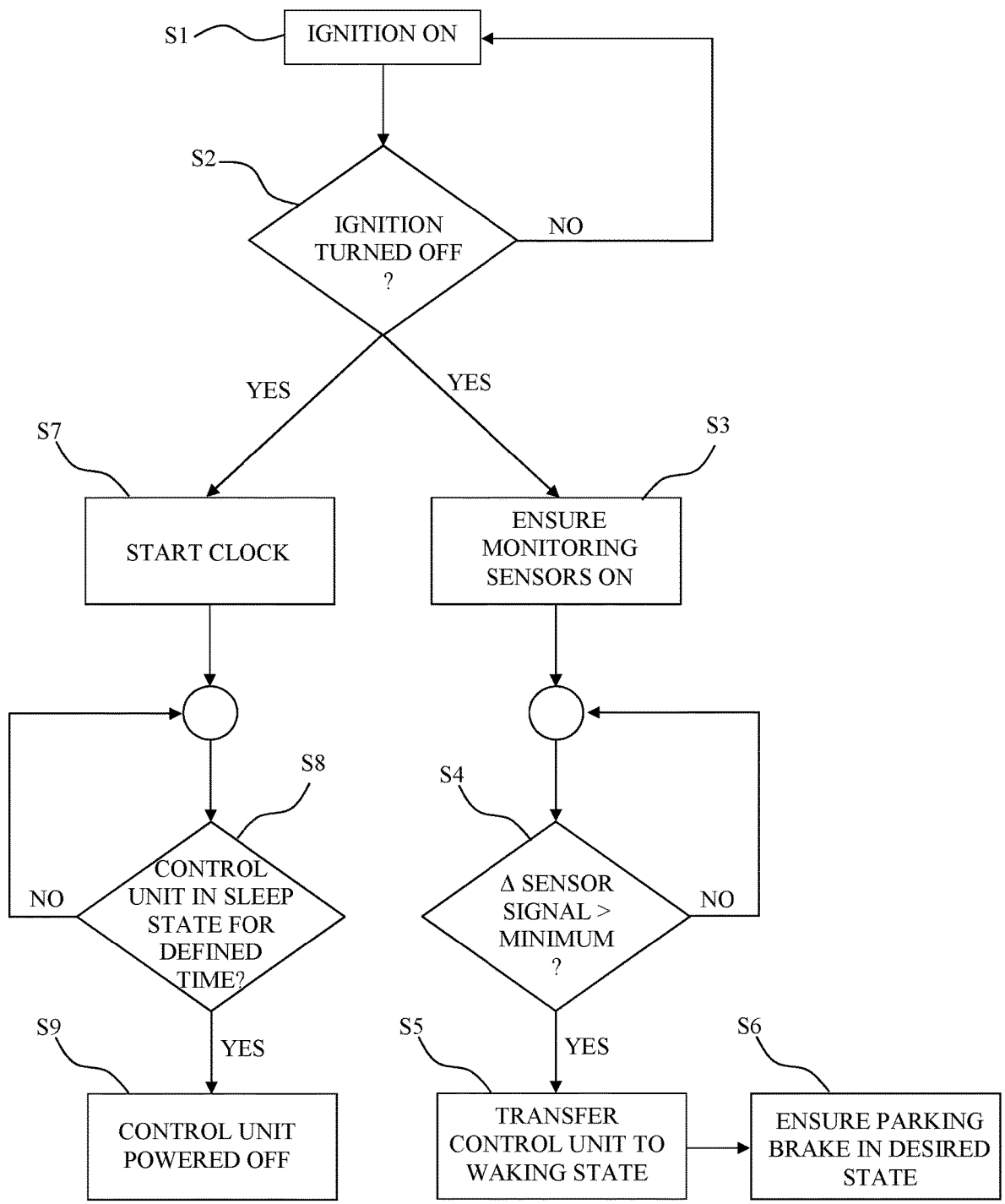

FIG. 3 shows a flow diagram with method steps for activating and deactivating a control unit which controls the electric brake motor 13 of the electromechanical braking system of the parking brake. The method starts in the first method step S1 with the operation of a vehicle with the ignition of the engine switched on. In the following method step S2 a query is issued as to whether the ignition in the vehicle has been turned off. If this is not the case, the No branch ("N") is followed to return to the first step S1 again and the query in accordance with step S2 is carried out again at periodic intervals.

If the result of the query in step S2 is that the ignition has been switched off and the vehicle engine has therefore been turned off, the procedure is continued following the Yes branch ("Y") to the two branches in accordance with the method steps S3 to S6, and in accordance with the method steps S7 to S9. In the first branch in accordance with the method steps S3 to S6, immediately after turning off the ignition in the vehicle the state of the control unit is transferred from a waking state, which the control unit occupies when the ignition is switched on, into a sleep state, in which the control device is disabled but one or more monitoring sensors are still active. If a sensor signal of the monitoring sensors occupies a value within a defined range of values, then the control unit is transferred back into the waking state.

Firstly, in the method step S3 it is ensured that one or more monitoring sensors are energized and thus able to generate a sensor signal, in spite of a deactivated control unit. In particular, due to the active design of the monitoring sensor it is possible to generate a permanent sensor signal, even if there is no change of state.

In the following method step S4, a query is made as to whether the sensor signal from the previous method step S3 undergoes a change which is greater than a minimum amount. If this is not the case, the No branch is followed to return to the beginning of method step S4 and the query is executed again at periodic intervals. If, on the other hand, the signal change is greater than the threshold value, the Yes branch is followed to advance to the next method step S5, in which the control unit is automatically transferred from the inactive sleep state into the waking state. This then allows measures to be implemented in the following method step S6 to ensure, for example, a desired state of the parking brake, in particular to carry out a re-tensioning operation by controlling the electric brake motor to generate a minimum braking force. In addition or as an alternative, it is also possible to perform any other action, such as activating and monitoring actuators of the hydraulic vehicle footbrake.

In the method steps S3 and S4, for example, wheel speed sensors or acceleration sensors are energized and examined for the presence of a signal change. This allows it to be determined whether the vehicle has been set in motion accidentally despite the parking brake being activated.

In the second branch with the method steps S7 to S9, in parallel and simultaneously with the execution of the steps S3 to S6, a time query is performed. To this end, in method step S7 a clock is started, wherein in the following method step S8 it is checked at regular intervals whether a defined, fixed time interval has elapsed during which the control unit is in the sleep state. If the time interval has not yet elapsed, the procedure returns to the beginning of method step S8 again following the No branch, and again at regular intervals a check is made for the expiry of the time interval. If, on the other hand, the result of the query in step S8 is that the time interval has elapsed, the Yes-branch is followed to step S9, in which the state of the control unit is changed from the sleep state into the powered-off state, in which the control device is disabled. The method is then terminated until the vehicle is restarted by switching on the ignition again.

The above-described method represents a simplified version of the activation and deactivation of the control unit. It may be appropriate to additionally consider another follow-on state that the control unit occupies after the ignition has been switched off in step S2, but before the control unit is transferred into the sleep state. In the follow-on state, which can also be maintained for a specified time interval, the control unit is still in the activated state, wherein the parking brake can only be activated in a limited way. During the follow-on state various sensor signals such as the wheel speeds are evaluated, in order to determine whether the vehicle has been accidentally set in motion within the follow-on period, whereupon the parking brake can be activated again. On the expiry of the follow-on period, the control unit itself is automatically transferred into the sleep state, whereupon the aforementioned method steps in accordance with steps S3 to S9 are carried out.

What is claimed is:

1. A method for activation and deactivation of a control unit configured to control an electrically activatable assembly, the method comprising:
    controlling, with the control unit, the electrically activatable assembly in a waking state of the control unit, the control unit being active in the waking state;
    switching the control unit from a sleep state of the control unit to the waking state based on a sensor signal of at least one monitoring sensor, the control unit being unable to control the electrically activatable assembly in the sleep state;
    maintaining the control unit in the sleep state over a specified time interval and automatically switching the control unit from the sleep state to the deactivated state after expiry of the specified time interval; and
    switching the control unit from a deactivated state of the control unit to the waking state only in response to switching on the control unit, the control unit being disabled and unable to control the electrically activatable assembly in the deactivated state.

2. The method according to claim 1 further comprising:
    one of (i) actively energizing and (ii) supplying energy to the at least one monitoring sensor in the sleep state.

3. The method according to claim 1 further comprising:
    automatically switching the control unit from the sleep state to the waking state after expiry of the specified time interval; and
    monitoring, with the control unit, in the waking state, a condition of one of (i) the electrically activatable assembly and (ii) an environment of the electrically activatable assembly.

4. The method according to claim 3 further comprising one of:
    controlling an actuator during the monitoring of the condition; and
    monitoring a behavior of the actuator during the monitoring of the condition.

5. The method according to claim 3 further comprising:
    automatically switching the control unit into the deactivated state after a completion of the monitoring of the condition.

6. The method according to claim 1, wherein the electrically activatable assembly is an electric brake motor of a vehicle parking brake, the controlling further comprising:
    controlling, with the control unit, in the waking state, the electric brake motor.

7. The method according to claim 6, wherein the at least one monitoring sensor is at least one of (i) a wheel speed sensor and (ii) an acceleration sensor, the method further comprising:

monitoring a sensor signal of the least one of (i) the wheel speed sensor and (ii) the acceleration sensor during the sleep state of the control unit.

8. The method according to claim 6 further comprising: monitoring a hydraulic brake pressure in a vehicle footbrake.

9. A control unit for controlling an electrically activatable assembly, the control unit configured to:
control the electrically activatable assembly in a waking state of the control unit, the control unit being active in the waking state;
switch from a sleep state of the control unit to the waking state based on a sensor signal of at least one monitoring sensor, the control unit being unable to control the electrically activatable assembly in the sleep state;
maintain the control unit in the sleep state over a specified time interval and automatically switch the control unit from the sleep state to the deactivated state after expiry of the specified time interval; and
switch from a deactivated state of the control unit to the waking state only in response to switching on the control unit, the control unit being disabled and unable to control the electrically activatable assembly in the deactivated state.

10. The control unit according to claim 9, wherein the control unit executes program code of a computer program product having to control the electrically activatable assembly and to switch between the waking state, the sleep state, and the deactivated state.

11. A parking brake for a vehicle, the parking brake comprising:
at least one electro-mechanical braking system on a vehicle wheel, the at least one electro-mechanical braking system having an electric brake motor configured to move a brake piston towards a brake disc to generate a braking force; and
a control unit for controlling adjustable components of the parking brake, the control unit configured to:
control the adjustable components of the parking brake in a waking state of the control unit, the control unit being active in the waking state;
switch from a sleep state of the control unit to the waking state based on a sensor signal of at least one monitoring sensor, the control unit being unable to control the adjustable components of the parking brake in the sleep state;
maintain the control unit in the sleep state over a specified time interval and automatically switch the control unit from the sleep state to the deactivated state after expiry of the specified time interval; and
switch from a deactivated state of the control unit to the waking state only in response to switching on the control unit, the control unit being disabled and unable to control the adjustable components of the parking brake in the deactivated state.

* * * * *